Feb. 15, 1927.
C. C. AVERILL
1,617,737
PROCESS FOR CONDITIONING CRUDE OIL EMULSIONS
Filed Sept. 2, 1924
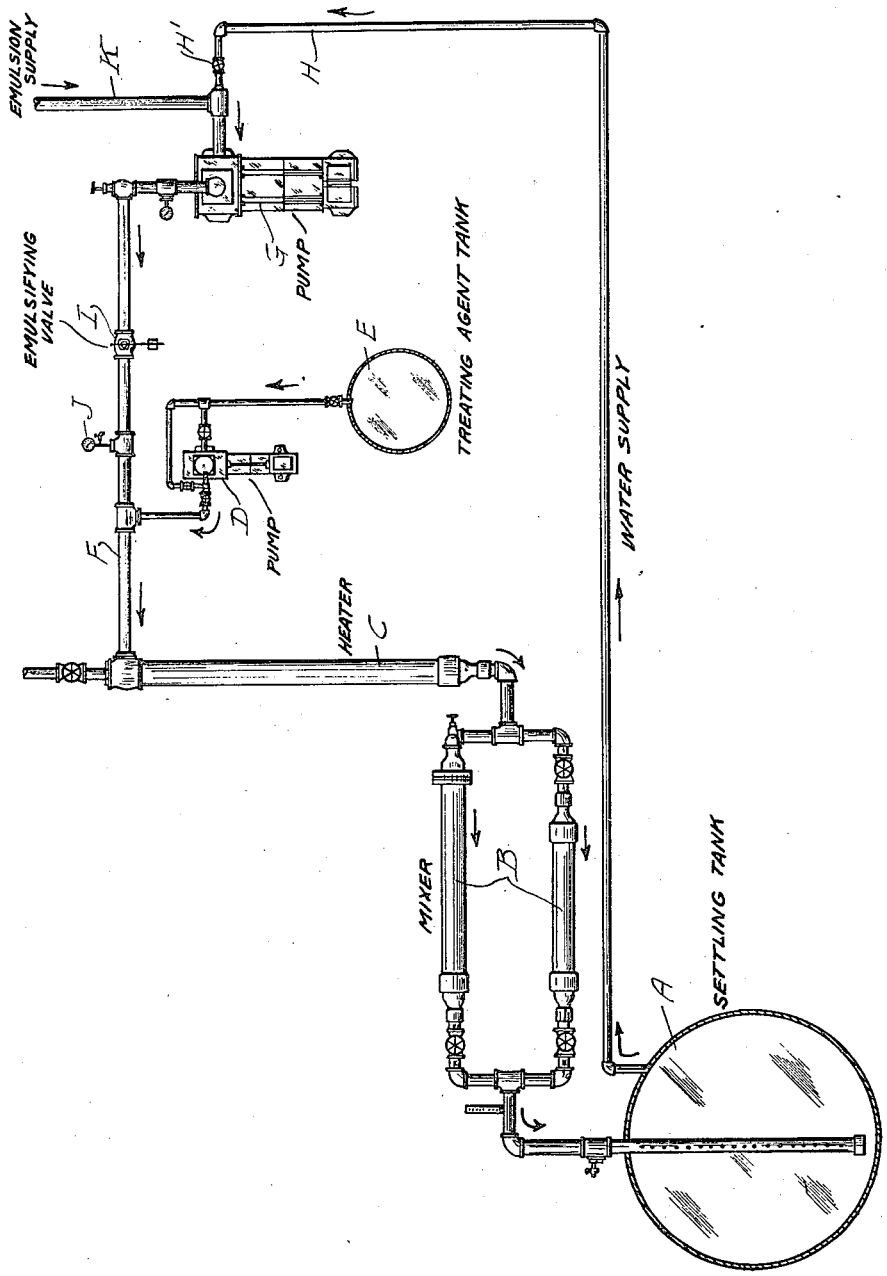
INVENTOR
Charles C. Averill,
By Bakewell & Church
ATTORNEYS Patented Feb. 15, 1927.

1,617,737

UNITED STATES PATENT OFFICE.

CHARLES C. AVERILL, OF HOUSTON, TEXAS, ASSIGNOR TO WM. S. BARNICKEL & COMPANY, OF WEBSTER GROVES, MISSOURI, A CORPORATION OF MISSOURI.

PROCESS FOR CONDITIONING CRUDE OIL EMULSIONS.

Application filed September 2, 1924. Serial No. 735,393.

This invention relates to the treatment of emulsions of mineral oil and water, such as petroleum emulsions, for the purpose of separating the oil from the water.

Petroleum emulsions are of the water-in-oil type and consist of oil constituting the continuous phase of the emulsion, droplets of water distributed throughout the body of oil and constituting the dispersed phase of the emulsions, and films of matter that encase the droplets of water. They are obtained from producing wells and from the bottom of oil storage tanks and are commonly referred to as "cut oil", "roily oil", "emulsified oil" and "bottom settlings".

I have discovered that if water is added to an emulsion of the character referred to and the mixture then subjected to an emulsifying operation, prior to the treatment with a chemical demulsifying agent to break the emulsion, that a more complete separation of the component parts of the emulsion and the recovery of a greater percentage of the oil can be effected. This, I believe, is due to the fact that the water which is added to the original emulsion and beat into same by the emulsifying operation, renders the emulsion so unstable that when it is subsequently subjected to treatment to break the same, there are sufficient droplets of water present in the emulsion to insure said droplets coalescing, and thus being thrown down or precipitated as the size of said droplets increases, due to coalescence. Whether or not the above explanation is correct I am unable to say, but I do know that crude oil emulsions which will not respond readily to treatment with any of the various chemical demulsifying agents now used for breaking emulsions, and in fact, all crude oil emulsions that are of a more or less permanent nature, and especially those containing a relatively small proportion of water, can be broken more easily if the emulsion is "conditioned" prior to the treatment to break the emulsion, by adding water to the emulsion and subjecting it to such action as to cause the original emulsion and added water to be emulsified. Accordingly, I claim to have discovered a process for breaking such emulsions that insures the recovery of a greater percentage of oil. My process can be practiced or carried out with various kinds of apparatus.

The figure of the drawings is a diagrammatic plan view of an apparatus that can be used for practicing my process.

Referring to the drawing A designates a settling tank into which an emulsion of mineral oil and water or brine is introduced after said emulsion has been subjected to treatment with a chemical demulsifying agent to break the emulsion, B designates a mixer through which the emulsion travels on its way to the tank A, C designates a heater in advance of said mixer through which the emulsion passes and D designates a pump that is used for drawing a chemical demulsifying agent from a container E and introducing it into a line F through which the emulsion is traveling to the heater C.

Before the emulsion is subjected to the action of said chemical demulsifying agent to break the emulsion, water is added to the emulsion and the mixture of water and emulsion is then subjected to an emulsifying operation. In the apparatus herein shown the pump G that is used for drawing the emulsion from a source of supply through the pipe K and feeding it through the line F, has a water pipe H tapped onto its intake side, thereby causing water to be commingled with the emulsion prior to passing through the pump G. At a point between the pump G and the point where the demulsifying agent enters the line F, is a mixing valve or emulsifying valve I. Said emulsifying valve may be of any preferred kind, the valve herein shown being a conventional weighted relief valve and having a passageway of such proportions or size to effect emulsification of the water and the original emulsion being forced through the line F by the pump G. Preferably a sight gauge J is arranged in the line F between the emulsifying valve I and the point at which the demulsifying agent is introduced into said line by the pump D, so as to enable the operator in charge of the apparatus to determine whether the quantity of water being added to the original emulsion should be increased or decreased by manipulating the valve H' in the water supply pipe H, it being possible to easily determine this by means of the centrifugal test. The amount of water that is added to the original emulsion will vary according to the nature of the emulsion, the age of same and the relative proportions of the component parts of the emulsion. Any percentage of water added to the original emulsion is beneficial, but the amount of water that is added to same can best be determined by testing a sample of the emulsion being treated so as to ascertain what quantity or portion of added water will give a sharp line of demarcation between the component parts of the sample when the same is subjected to a test to break the emulsion. For example, if a sample of the particular emulsion containing treating agent is tested in a centrifuge, using 10 c. c. of the same, 5 c. c. of gasolene and permitted to run for three minutes, some of the constituents of the sample will be thrown down, but a considerable proportion, especially the very finely divided droplets, will remain in the oil and there will be no clear line of demarcation. Now, if this same test is made by first emulsifying 10% of water with the sample being tested, it will be found that a very sharp line of demarcation is obtained. The amount of water in an emulsion of the kind to which my invention relates may vary from 1% to 80%, and the amount of water which it may be necessary to add to the emulsion will usually be no more than two to three times the amount of water already present in the emulsion, but rarely less than 10%. Anyone skilled in the art of treating oil emulsion with chemical demulsifying agents can readily determine the proper amount of water to add to give a sharp line of demarcation by means of the centrifugal test, the quantity of water that is added varying from 5% to 80%, according to the nature or condition of the emulsion.

The water that is added to the emulsion may either be fresh water or salt water. In most instances salt water will be used, because in an oil treating plant there is always a large quantity of salt water available, which salt water is obtained from the bottom of the settling tank in which the emulsion is broken. Therefore, I prefer to have the pipe H lead from a supply of salt water which may be the salt water which collects at the bottom of the tank A. There is a further advantage in using salt water, in that the specific gravity of salt water is greater than the specific gravity of fresh water, but, as previously stated, either fresh water or salt water may be used in practising my process.

Having thus described my invention, what I claim as new and desire to secure by Letters Patent is:

1. A process for breaking a crude oil emulsion characterized by adding water to the original emulsion, and then subjecting said mixture to an emulsifying operation and then to the action of a chemical demulsifying agent.

2. A process for breaking a crude oil emulsion characterized by subjecting the emulsion to an emulsifying operation with salt water and then adding a chemical demulsifying agent to same.

3. A process for breaking crude oil emulsions characterized by adding water to the emulsion to be treated, subjecting said mixture to an emulsifying operation, adding a chemical demulsifying agent to said mixture, then heating the mass, and thereafter permitting the mass to remain in a quiescent state.

CHARLES C. AVERILL.